(12) United States Patent
Ward et al.

(10) Patent No.: US 10,977,034 B2
(45) Date of Patent: Apr. 13, 2021

(54) INSTRUCTION COMPLETION TABLE WITH READY-TO-COMPLETE VECTOR

(71) Applicant: INTERNATIONAL BUSINESS MACHINES CORPORATION, Armonk, NY (US)

(72) Inventors: Kenneth L. Ward, Austin, TX (US); Susan E. Eisen, Round Rock, TX (US); Glenn O. Kincaid, Austin, TX (US); Dung Q. Nguyen, Austin, TX (US); Deepak K. Singh, Raleigh, NC (US); Gaurav Mittal, Round Rock, TX (US); Christopher M. Mueller, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 16/182,760

(22) Filed: Nov. 7, 2018

(65) Prior Publication Data

US 2020/0142697 A1    May 7, 2020

(51) Int. Cl.
*G06F 9/30* (2018.01)
*G06F 9/38* (2018.01)

(52) U.S. Cl.
CPC ........ *G06F 9/30036* (2013.01); *G06F 9/3855* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 6,035,394 A | * 3/2000 | Ray | G06F 9/30043 712/245 |
| 6,356,918 B1 | * 3/2002 | Chuang | G06F 9/3836 |
| 6,539,502 B1 | * 3/2003 | Davidson | G06F 11/3466 712/227 |
| 6,658,555 B1 | 12/2003 | Kahle et al. | |
| 6,721,874 B1 | * 4/2004 | Le | G06F 9/384 712/218 |
| 6,934,865 B2 | 8/2005 | Moritz et al. | |
| 6,990,568 B2 | 1/2006 | Burch | |
| 7,089,406 B2 | 8/2006 | Ludden et al. | |
| 7,278,011 B2 | 10/2007 | Eisen et al. | |

(Continued)

OTHER PUBLICATIONS

Mutlu, et al., "Runahead Execution: An Alternative to Very Large InstructionWindows for Out-of-order Processors", IEEE Computer Society, Dec. 2003,12 pages.

(Continued)

*Primary Examiner* — John M Lindlof
(74) *Attorney, Agent, or Firm* — Tutunjian & Bitetto, P.C.; Bryan Bortnick (57) ABSTRACT

A computer-implemented method, computer program product, and computer processing system are provided. The method includes processing, by a superscalar processing pipeline, respective sets of instructions in respective instruction processing cycles using an Instruction Completion Table (ICT) with a Ready-To-Complete (RTC) vector. The ICT includes a plurality of entries, each corresponding to a respective one of the instructions. A Next-To-Complete (NTC) instruction from among the respective sets of instructions is computed using the RTC vector.

19 Claims, 5 Drawing Sheets

(56) References Cited

U.S. PATENT DOCUMENTS

| | | |
|---|---|---|
| 7,343,478 B2 | 3/2008 | Kan et al. |
| 8,234,484 B2 | 7/2012 | Indukuru et al. |
| 8,832,416 B2 | 9/2014 | Chen et al. |
| 9,442,734 B2 | 9/2016 | Gonion |
| 2005/0228972 A1 | 10/2005 | Eisen et al. |
| 2015/0370561 A1 | 12/2015 | Stark |
| 2016/0125263 A1 | 5/2016 | Sankaranarayanan et al. |

OTHER PUBLICATIONS

Vajapeyam, et al., "Improving Superscalar Instruction Dispatch and Issue by Exploiting Dynamic Code Sequences", ACM SIGARCH 24th Annual International Symposium on Computer Architecture, Jun. 1997, 12 pages.

Taha, et al., "An Instruction Throughput Model of Superscalar Processors", Proceedings of the 14th IEEE International orkshop on Rapid Systems Prototyping (RSP'03), Jun. 2003, 8 pages.

* cited by examiner

INSTRUCTION COMPLETION TABLE WITH READY-TO-COMPLETE VECTOR

BACKGROUND

Technical Field

The present invention relates generally to information processing and, in particular, to an instruction completion table with a ready-to-complete vector.

Description of the Related Art

In a microprocessor, the rate of instructions is a bottleneck for many applications. If the rate of completion is too slow, then the completion table can get filled up quickly, and stop instruction dispatch. This will lead to significant performance loss. Hence, there is a need for improving the use of the completion table.

SUMMARY

According to an aspect of the present invention, a computer-implemented method is provided. The method includes processing, by a superscalar processing pipeline, respective sets of instructions in respective instruction processing cycles using an Instruction Completion Table (ICT) with a Ready-To-Complete (RTC) vector. The ICT includes a plurality of entries, each corresponding to a respective one of the instructions. A Next-To-Complete (NTC) instruction from among the respective sets of instructions is computed using the RTC vector.

According to another aspect of the present invention, a computer program product is provided for managing instruction processing. The computer program product includes a computer readable storage medium having program instructions embodied therewith. The program instructions are executable by a computer to cause the computer to perform a method. The method includes processing, by a superscalar processing pipeline, respective sets of instructions in respective instruction processing cycles using an Instruction Completion Table (ICT) with a Ready-To-Complete (RTC) vector. The ICT includes a plurality of entries, each corresponding to a respective one of the instructions. A Next-To-Complete (NTC) instruction from among the respective sets of instructions is computed using the RTC vector.

According to yet another aspect of the present invention, a computer processing system is provided. The system includes a superscalar processing pipeline, configured to process respective sets of instructions in respective instruction processing cycles using an Instruction Completion Table (ICT) with a Ready-To-Complete (RTC) vector. The ICT includes a plurality of entries, each corresponding to a respective one of the instructions. A Next-To-Complete (NTC) instruction from among the respective sets of instructions is computed using the RTC vector.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to an instruction completion table with a ready-to-complete vector.

The present invention provides an approach whereby an instruction completion table can be used to complete a large number of instructions per cycle with the use of a ready-to-complete vector. Completion of a large number of instructions per cycle is achieved using the ready-to-complete vector in that the ready-to-complete vector allows for more efficient use of the instruction completion table as compared to the prior art, in order to prevent the instruction completion table from filling up too quickly and stopping instruction dispatch. In this way, overall computer performance is improved. To that end, the term "instruction processing cycle" as used herein refers to the time between two pulses of an oscillator which is used as a clock within a computer.

Figure 1:
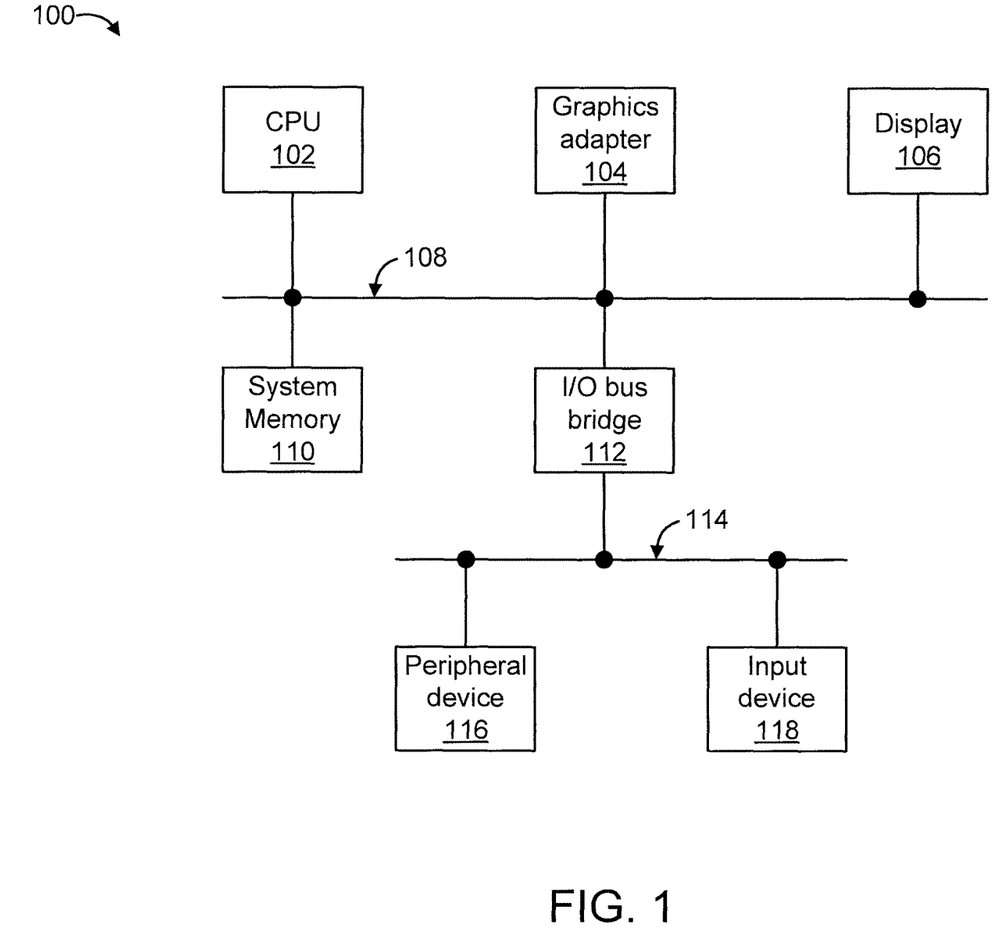
FIG. 1 shows an exemplary computer processing system to which the present invention may be applied, in accordance with an embodiment of the present invention.

FIG. 1 shows an exemplary computer processing system 100 to which the present invention may be applied, in accordance with an embodiment of the present invention.

The computer processing system 100 includes a central processing unit (CPU) 102 connected to a system bus 108. In an embodiment, the CPU 102 is a superscalar CPU. The computer processing system 100 further includes a graphics adapter 104 connected to system bus 108 for providing user interface information to a display 106. The computer processing system 100 also includes a system memory 110 and an input/output (I/O) bus bridge 112 connected to system bus 108. I/O bus bridge 112 couples an I/O bus 114 to system bus 108, relaying and/or transforming data transactions from one bus to the other bus. Computer processing system 100 also includes one or more peripheral devices (with one shown for the sake of illustration) 116 and one or more input devices (with one shown for the sake of illustration) 118 connected to I/O bus 114. The peripheral devices 116 can include, for example, but are not limited to a hard disk drive, a printer, and so forth. The input devices 118 can include, but are not limited to, a mouse, a trackball, a keyboard, a camera, and so forth.

While a particular configuration of a computing device is shown in FIG. 1, it is to be appreciated that the present invention is not limited to solely such configuration. Hence, one of ordinary skill in the art will contemplate this and various other computing configurations to which the present invention can be applied, while maintaining the spirit of the present invention.

Figure 2:
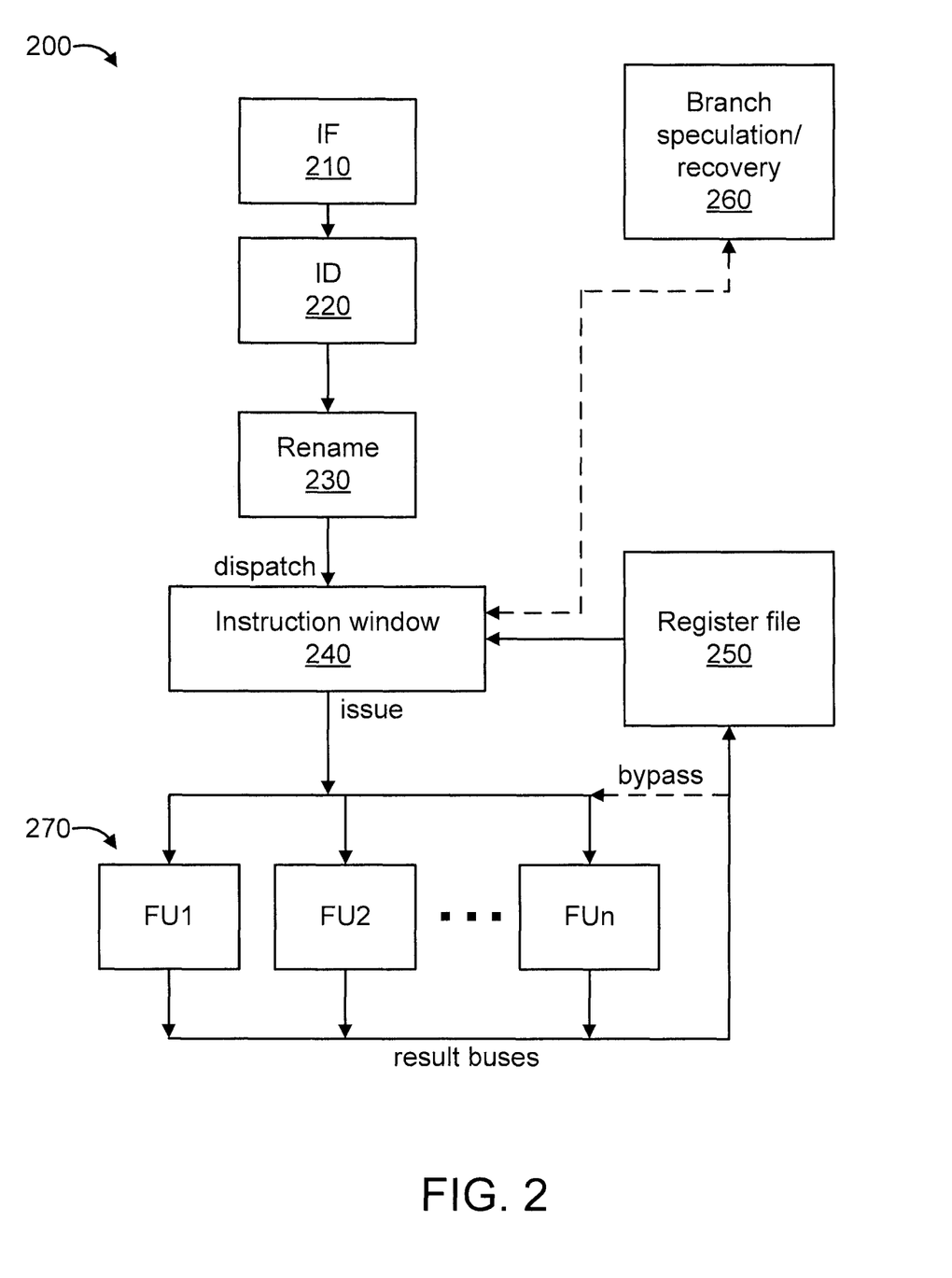
FIG. 2 shows an exemplary superscalar processing pipeline to which the present invention may be applied, in accordance with an embodiment of the present invention.

FIG. 2 shows an exemplary superscalar processing pipeline 200 to which the invention principles may be applied, in accordance with an embodiment of the present invention. As an example, superscalar processing pipeline 200 can be included in CPU 102 of FIG. 1 may include.

The superscalar processing pipeline 200 includes an instruction fetch unit (IF) 210, an instruction decode unit (ID) 220, a register renaming unit (Rename) 230, an instruction window 240, a register file 250, a branch speculation/recovery unit 260, and a set of functional units 270 (including FU1 through FUn).

By the superscalar processing pipeline 200, instructions are fetched and decoded, and source and destination registers are renamed (to eliminate false dependencies due to architectural register reuse by successive instructions that lack any real dependencies there between) before the instructions are dispatched to the instruction window 240 to wait for their source operands to be ready. The instructions are then issued by the instruction window 240 to one or more of the functional units 270 for execution, where results of the functional units 270 are provided on result buses.

It is to be appreciated that the configuration of superscalar processing pipeline 200 is but one of a myriad of processing configurations to which the present invention can be applied. Thus, other processing configurations can also be readily used, given the teachings of the present invention provided herein, while maintaining the spirit of the present invention.

Figure 3:
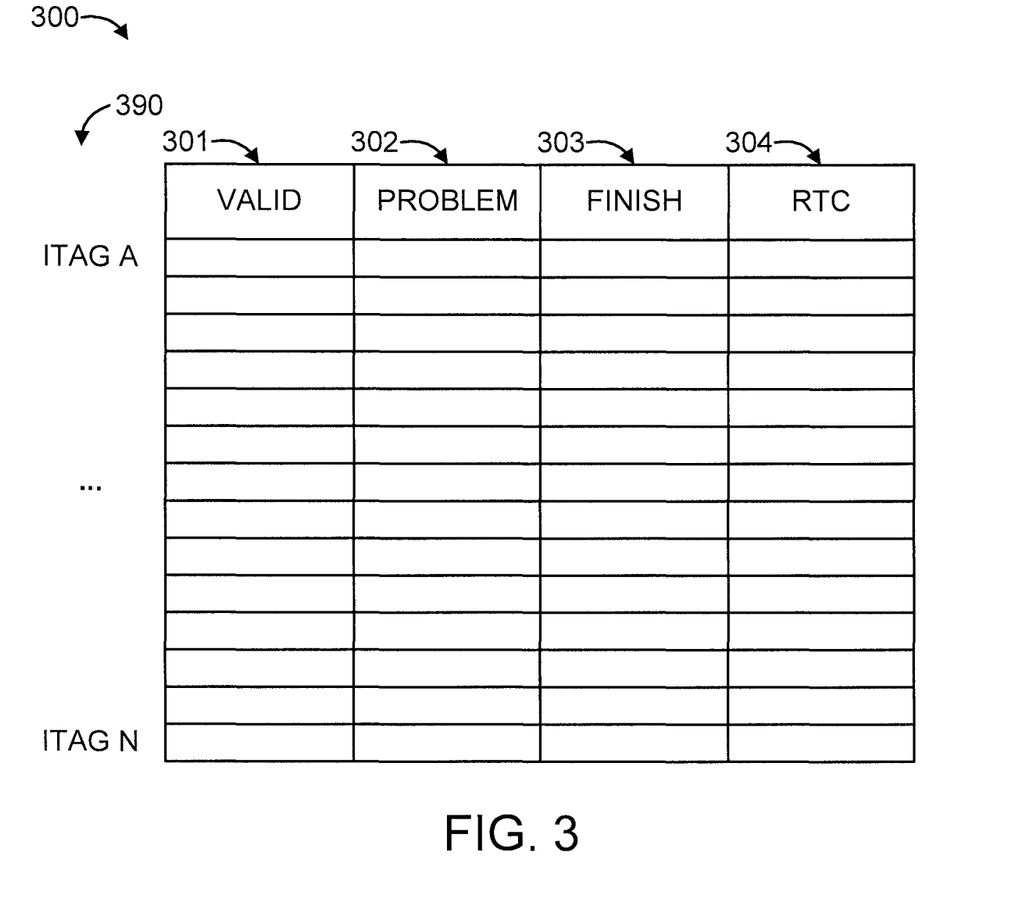
FIG. 3 shows an exemplary Instruction Completion Table (ICT) to which the present invention can be applied, in accordance with an embodiment of the present invention.

FIG. 3 shows an exemplary Instruction Completion Table (ICT) 300 to which the present invention can be applied, in accordance with an embodiment of the present invention.

The ICT 300 is direct mapped, and includes a set of rows 390, spanning from ITAG A to ITAG N, a column 301 for "valid", a column 302 for "problem", a column 303 for "Finish", and a column 304 for "RTC" (Ready-To-Complete). The ITAG is an Instruction TAG or instruction identifier that is used to identify and track a respective instruction being processed. The valid column 301 is used to indicate whether a currently processed instruction (hereinafter "current instruction") is valid. The problem column 302 is used to indicate whether there is a problem in processing the current instruction. Accordingly, the problem column 302 can be used to store exception trouble code for a given ITAG. The finish column 303 is used to indicate whether processing of the current instruction has finished, and its value is determined as described below. The RTC column 304 is used to indicate whether the current instruction is ready-to-complete (have its results committed), and its value is determined as described below.

The ICT 300 includes the following general attributes:
(1) Tracks all instructions in core while out-of-order;
(2) N entries track up to N instructions in flight, where N is an integer;
(3) X write ports for dispatch/finish+Y write ports for finish, where X and Y are integers;
(4) Each ICT entry tracks one instruction (one of ITAG A through N);
(5) Stores information needed for completion, flush, and exception trouble code;
(6) Completion is always in dispatch order;
(7) ICT indexed by ITAGs;
(8) Entries per thread: N for ST, N/2 for SMT2, N/4 for SMT4;
(9) Oldest instruction per thread tracked with tail pointers;
(10) ICT organized by physical thread, logical mapping happens elsewhere;
(11) Each entry has a ready-to-complete bit to signal that the ICT row is ready to complete when (i) the instruction is valid due to dispatch, (ii) the instruction is finished, and (iii) the instruction does not cause an exception (based on the exception trouble code) and needs special handling; and (12) Qualify finish reports to create a Ready-To-Complete (RTC) vector 601. The finish reports can be qualified with, for example, one or more of the following: atomic; flush; and so forth.

The RTC vector may be "sticky" such that completed bits remain set until a group of entries is completed.

A description will now be given regarding instruction completion, in accordance with an embodiment of the present invention.
(1) Instructions are completed in dispatch order;
(2) Completion is allowed only when the RTC=1.
(3) Complete next completion I, by examining RTC vector;
(4) Arbitrate, if necessary, between threads.
(5) Broadcast completion ITAG.

A description will now be given regarding finish and complete via the RTC bit, in accordance with an embodiment of the present invention.

Regarding such finish and complete via the RTC bit, the following applies:
(1) X+Y Finish reports:
(2) Finishes occur out-of-order;
(3) ICT includes a finish bit and exception trouble code;
(4) Finish bits in ICT will be set to 0 at dispatch and the Ready-to-complete (RTC) bit is set to 0. The exception trouble code is also written in the ICT at dispatch or finish.
(5) When ICT receives a finished ITAG, it will set the finish bit of the corresponding ITAG to 1. The completion logic will then examine the exception trouble code to see if the instruction can be completed or not.
  If finish bit=1 and if exception trouble code=0, then the Ready-to-complete (RTC) bit of the corresponding to that ITAG is set to 1 to indicate that this instruction is ready to be completed.
  If finish bit=1 and if exception trouble code is not 0, then the RTC bit will be kept at 0, to indicate that this instruction may experience some type of exception and will need special handling.
(6) If the RTC bit=1, then the instruction can be completed if it is the oldest instruction to be completed, or if all of the older instructions also have their RTC bits set to 1.
(7) If the finish bit=1, the exception trouble code is not 0 and RTC=0, then the exception state machine will examine the exception code when this particular instruction is the oldest instruction in the machine (i.e., Next-to-complete (NTC)). If this instruction is NTC, then the exception state machine will take action based on the exception code. After the exception state machine has finished handling the excepting conditions, it will then signal the ICT to set the RTC bit=1 to allow the instruction to complete.

In an embodiment, N ITAGs per entry can be allowed with just the one RTC for the entry indicating that the entry can be completed.

Also, in addition to valid and finish, the RTC also looks at atomicity. For example, the RTC bit for an entry that is part of an atomic group will only be set when all ITAGs of the atomic group are valid and finished, and all entries of the atomic group will have their RTC bit set at the same time so that the atomic group will be completed atomically.

A description will now be given regarding a flush operation, in accordance with an embodiment of the present invention.
(1) Broadcasted Flush clears ITAG valid in ICT, thus also clearing RTC.
(2) Dispatch after flush will set ICT valid and clear ICT finish.

Figure 4:
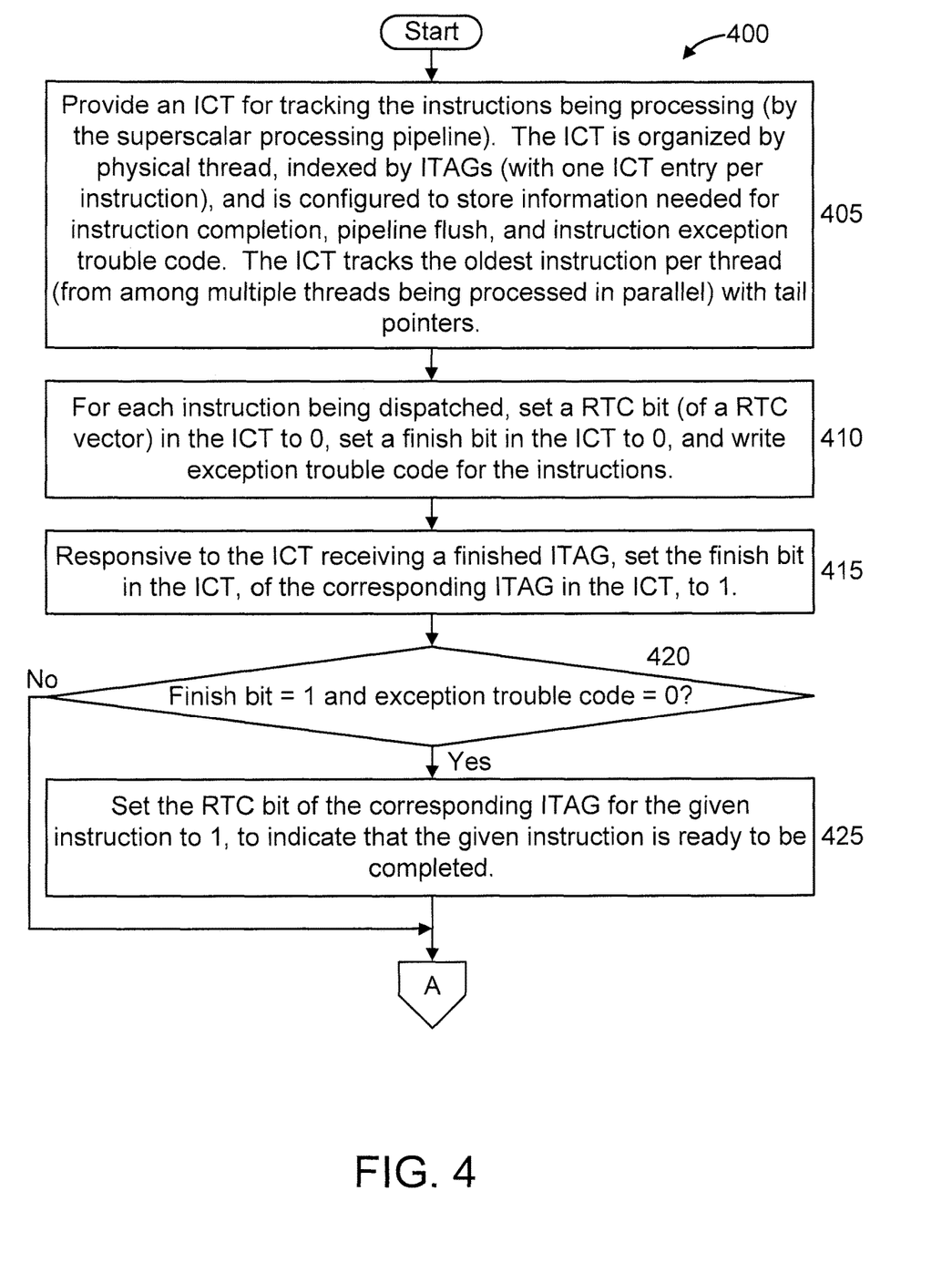
FIGS. 4-5 show an exemplary method using an Instruction Completion Table (ICT) with a Ready-To-Complete (RTC) vector, in accordance with an embodiment of the present invention.
Figure 5:
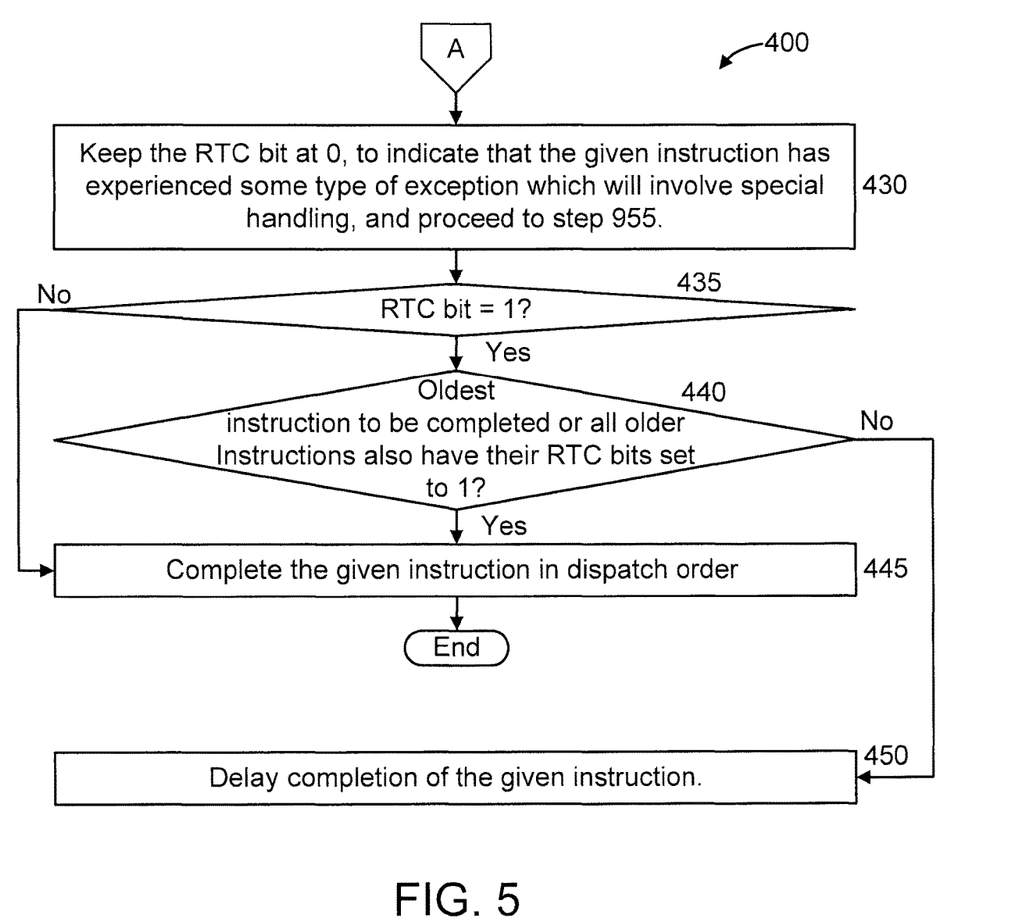

FIGS. 4-5 show an exemplary method 400 using an Instruction Completion Table (ICT) with a Ready-To-Complete (RTC) vector. The method 400 is performed for respective set of instructions being processing by a superscalar processing pipeline (e.g., superscalar processing pipeline 200 of FIG. 2).

At step 405, provide an ICT for tracking the instructions being processing (by the superscalar processing pipeline). The ICT is organized by physical thread, indexed by ITAGs (with one ICT entry per instruction), and is configured to store information needed for instruction completion, pipeline flush, and instruction exception trouble code. The ICT tracks the oldest instruction per thread (from among multiple threads being processed in parallel) with tail pointers.

At step 410, for each instruction being dispatched, set a RTC bit (of a RTC vector) in the ICT to 0, set a finish bit in the ICT to 0, and write exception trouble code for the instructions.

At step 415, responsive to the ICT receiving a finished ITAG, set the finish bit in the ICT, of the corresponding ITAG in the ICT, to 1.

At step 420, for a given instruction, determine whether the given instruction can be completed by examining the exception trouble code. That is, determine if the finish bit=1 and the exception trouble code=0 for the given instruction. If so, then proceed to step 425. Otherwise, proceed to step 430.

At step 425 (corresponding to the finish bit=1 and the exception trouble code=0), set the RTC bit of the corresponding ITAG for the given instruction to 1, to indicate that the given instruction is ready to be completed.

At step 430 (corresponding to the finish bit=1 and the exception trouble code 0), keep the RTC bit at 0, to indicate that the given instruction has experienced some type of exception which will involve special handling, and proceed to step 455.

At step 435, determine if the RTC bit=1. If so, then proceed to step 440. Otherwise, proceed to step 445.

At step 440, determine if the given instruction is the oldest instruction to be completed or if all of the older instructions also have their RTC bits set to 1. If so, then proceed to step 445. Otherwise, proceed to step 450.

At step 445 (corresponding to the finish bit=0 and the trouble exception code=0), complete the given instruction in dispatch order.

At step 450, delay completion of the given instruction.

At step 455 (corresponding to the finish bit=0, the exception trouble code≠0, and RTC=0), examine the exception code when the given instruction is the oldest instruction in the machine (i.e., Next-To-Complete (NTC)).

At step 460, take action based on the exception code and signal the ICT to set the RTC bit to 1 to allow the given instruction to complete, responsive to a completion of handling the exception conditions.

Hence, in an embodiment, a Next-To-Complete (NTC) instruction from among the respective sets of instructions is computed using the RTC vector using several methods. For example, one method can involve performing a count leading 1s of the RTC bits in the RTC vector. With this method a Next to Complete ITAG can be generated directly using the count. Of course, other methods can also be used, while maintaining the spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method, comprising:
processing, by a superscalar processing pipeline, respective sets of instructions in respective instruction processing cycles using an Instruction Completion Table (ICT) with a Ready-To-Complete (RTC) vector,
wherein the ICT comprises a plurality of entries organized by physical thread, each corresponding to a respective one of the instructions in a core and tracked out of order, and wherein a Next-To-Complete (NTC) instruction from among the respective sets of instructions is computed based on the RTC vector, and the method further comprises:
restricting a completion of a given one of the instructions when any of a RTC bit in the RTC vector for the given one of the instructions and RTC bits in the RTC vector for older ones of the instructions are unequal to one; and
permitting instruction completion in dispatch order for the given one of the instructions when all of the RTC bit in the RTC vector for the given one of the instructions and the RTC bits in the RTC vector for the older ones of the instructions are all equal to one or when the RTC bit in the RTC vector for the given one of the instructions is equal to one and the given one of the instructions is the oldest instruction to be completed.

2. The computer-implemented method of claim 1, further comprising tracking, by the ICT, all of the instructions in each of the respective sets during the respective instruction processing cycles while at least some of the instructions in at least some of the respective sets are processed out-of-order.

3. The computer-implemented method of claim 1, wherein said processing step selectively processes a number of the instructions during each of the respective instruction processing cycles, from only one of the instructions up to any number of the instructions including all of the instructions for which information is stored in the ICT.

4. The computer-implemented method of claim 1, further comprising, at instruction dispatch for each given one of the instructions, setting a Ready-To-Complete (RTC) bit in the RTC vector and a finish bit in the ICT corresponding to the given one of the instructions to zero and writing exception trouble code for the given one of the instructions to the ICT.

5. The computer-implemented method of claim 1, further comprising setting a Ready-To-Complete (RTC) bit to a value that signals that a corresponding ICT row is ready to complete responsive to a corresponding one of the instructions being finished without an exception.

6. The computer-implemented method of claim 1, wherein the RTC bit is set to a different value at instruction dispatch.

7. The computer-implemented method of claim 1, further comprising maintaining a RTC bit in the ICT for a given instruction at a same value assigned at dispatch to indicate that the given instruction has experienced an exception.

8. The computer-implemented method of claim 1, further comprising, responsive to a finish bit in the ICT being set to one and the given instruction determined to involve an exception, executing exception code in the ICT for the given instruction.

9. The computer-implemented method of claim 1, wherein the ICT is configured to store exception code and information for instruction completion and pipeline flush.

10. The computer-implemented method of claim 1, wherein, for each of a plurality of threads being processed in parallel by the superscalar processing pipeline, an oldest one of the instructions belonging thereto is tracked by the ICT with a respective tail pointer.

11. The computer-implemented method of claim 1, wherein the RTC vector is configured to be sticky such that completed bits thereof remain set until a group of entries is completed.

12. The computer-implemented method of claim 1, wherein N ITAGS per entry are permitted with just the RTC vector indicating that the entry can be completed.

13. The computer-implemented method of claim 1, wherein an RTC bit for an entry that is part of an atomic group is only set when all ITAGS of the atomic group are valid and finished, and wherein all entries of the atomic group have their RTC bit set at a same time so that the atomic group is completed atomically.

14. A computer program product for managing instruction processing, the computer program product comprising a computer readable storage medium having program instructions embodied therewith, the program instructions executable by a computer to cause the computer to perform a method comprising:
  processing, by a superscalar processing pipeline, respective sets of instructions in respective instruction processing cycles using an Instruction Completion Table (ICT) with a Ready-To-Complete (RTC) vector,
  wherein the ICT comprises a plurality of entries organized by physical thread, each corresponding to a respective one of the instructions in a core and tracked out of order, and wherein a Next-To-Complete (NTC) instruction from among the respective sets of instructions is computed based on the RTC vector, and the method further comprises:
  restricting a completion of a given one of the instructions when any of a RTC bit in the RTC vector for the given one of the instructions and RTC bits in the RTC vector for older ones of the instructions are unequal to one; and
  permitting instruction completion in dispatch order for the given one of the instructions when all of the RTC bit in the RTC vector for the given one of the instructions and the RTC bits in the RTC vector for the older ones of the instructions are all equal to one or when the RTC bit in the RTC vector for the given one of the instructions is equal to one and the given one of the instructions is the oldest instruction to be completed.

15. The computer program product of claim 14, wherein the method further comprises tracking, by the ICT, all of the instructions in each of the respective sets during the respective instruction processing cycles while at least some of the instructions in at least some of the respective sets are processed out-of-order.

16. The computer program product of claim 14, wherein said processing step selectively processes a number of the instructions during each of the respective instruction processing cycles, from only one of the instructions up to any number of the instructions including all of the instructions for which information is stored in the ICT.

17. The computer program product of claim 14, wherein the method further comprises, at instruction dispatch for each given one of the instructions, setting a Ready-To-Complete (RTC) bit in the RTC vector and a finish bit in the ICT corresponding to the given one of the instructions to zero and writing exception trouble code for the given one of the instructions to the ICT.

18. The computer program product of claim 14, wherein the method further comprises setting a Ready-To-Complete (RTC) bit to a value that signals that a corresponding ICT row is ready to complete responsive to a corresponding one of the instructions being finished without an exception.

19. A computer processing system, comprising:
  a superscalar processing pipeline, configured to process respective sets of instructions in respective instruction processing cycles using an Instruction Completion Table (ICT) with a Ready-To-Complete (RTC) vector,
  wherein the ICT comprises a plurality of entries organized by physical thread, each corresponding to a respective one of the instructions in a core and tracked out of order, and wherein a Next-To-Complete (NTC) instruction from among the respective sets of instructions is computed based on the RTC vector, and
  wherein the superscalar processing pipeline is further configured to restrict a completion of a given one of the instructions when any of a RTC bit in the RTC vector for the given one of the instructions and RTC bits in the RTC vector for older ones of the instructions are unequal to one, and permit instruction completion in dispatch order for the given one of the instructions when all of the RTC bit in the RTC vector for the given one of the instructions and the RTC bits in the RTC vector for the older ones of the instructions are all equal to one or when the RTC bit in the RTC vector for the given one of the instructions is equal to one and the given one of the instructions is the oldest instruction to be completed.

* * * * *